United States Patent [19]

Meier

[11] 4,172,985
[45] Oct. 30, 1979

[54] ELECTRIC COUPLING AND BRAKE MOTOR

[75] Inventor: Karl-Heinz Meier, Zeilhard, Fed. Rep. of Germany

[73] Assignee: Quick-Rotan Becker & Notz KG, Darmstadt, Fed. Rep. of Germany

[21] Appl. No.: 861,635

[22] Filed: Dec. 19, 1977

[30] Foreign Application Priority Data

Dec. 20, 1976 [DE] Fed. Rep. of Germany ....... 2657659

[51] Int. Cl.² ............................................. H02K 7/10
[52] U.S. Cl. ..................................... 310/74; 310/76; 310/77; 192/18 B
[58] Field of Search ....................... 310/74, 75, 76, 77; 192/18 A, 18 B, 18 R

[56] References Cited

U.S. PATENT DOCUMENTS

| | | | |
|---|---|---|---|
| 3,600,616 | 8/1971 | Yokoyama | 310/76 |
| 3,750,781 | 8/1973 | Lengsfeld | 310/76 X |
| 3,862,444 | 1/1975 | Hale | 310/74 |
| 3,885,175 | 5/1975 | Palloch | 310/76 X |

Primary Examiner—Donovan F. Duggan
Attorney, Agent, or Firm—Michael J. Striker

[57] ABSTRACT

An electric coupling and brake motor comprises a continuously rotating main or drive shaft of the motor and an output shaft coaxially therewith, on which a cylindrical coupling member is coaxially mounted for rotation therewith and axially immovable with respect thereto. A flywheel is mounted on the drive shaft for rotation therewith and axially movable with respect thereto and facing one of the end faces of the coupling member, and a brake abutment member is mounted in the motor housing movable only in axial direction toward and away from the other end face of the coupling member. The motor includes further electromagnet means for selectively moving the flywheel or the brake abutment member in axial direction into frictional engagement with the respective end face of the coupling member to rotate the output shaft together with the drive shaft or to hold the output shaft stationarily during rotation of the drive shaft.

18 Claims, 2 Drawing Figures

ELECTRIC COUPLING AND BRAKE MOTOR

BACKGROUND OF THE INVENTION

The present invention relates to an electric coupling and brake motor in which a coupling member fixed to the output shaft for rotation therewith may be electromagnetically coupled with a flywheel on the continuously rotating drive shaft of the motor and/or with a non-rotatable brake abutment member.

From the German Auslegeschrift No. 1,613,350 it is known to arrange in such a motor the coupling member on the output shaft axially adjustable and to make the same as a part of a magnetic circuit for the coupling, respectively the brake magnets.

Especially in arrangements in which such coupling and brake motors are used for speed regulation drives and/or positioning drives it is essential to reduce the time in which the output shaft will be rotated with the same speed as the drive shaft of the motor and also to reduce the time in which the output shaft can be fully braked, so that the respective drive will follow quickly any control signals. Since in addition the transmitted energy will depend greatly on the terminal loading of the coupling and braking system, it is also desired to reduce the development of heat during operation of the system as much as possible.

SUMMARY OF THE INVENTION

It is an object of the present invention to provide a motor of the aforementioned kind in which the above-mentioned requirements for the perfect working of such a motor are obtained in a better manner than in such motors according to the prior art.

With these and other objects in view, which will become apparent as the description proceeds, the electric coupling and brake motor according to the present invention mainly comprises a drive shaft adapted to be rotated continuously by the motor, an output shaft coaxial with the drive shaft, a coupling member mounted on the output shaft for rotation therewith and axially immovable with respect thereto,, a flywheel mounted to one side of the coupling member on the drive shaft for rotation therewith and axially movable relatively thereto toward and away from the coupling member, a brake abutment member on the other side of the coupling member, means mounting the brake abutment member movable only in axial direction toward and away from the coupling member, and electromagnet means for selectively moving the flywheel, respectively the brake abutment member into frictional engagement with the coupling member.

This construction permits to hold the masses of the motor which, during operation, have to be accelerated and braked, especially small and light. Therewith the necessary kinetic energy for acceleration and braking of these masses is reduced to a minimum. In a drive for regulating the number of revolutions per minute of the output shaft it is also possible to adapt the actual number of revolutions to the desired number of revolutions with great exactness. In the case of positioning drive it is possible to arrest rotation of the output shaft at an exact position and at very short time. The heat created during operation remains also comparatively smaller. The masses of the flywheel and of the brake abutment need only be axially moved through very short distances, usually at a fraction of a millimeter so that a prompt response may be obtained.

For the axial adjustment of the position of the flywheel, a cylindrical flywheel positioning member is preferably used, which is coaxially mounted on the drive shaft of the motor, secured to the motor housing against rotation but axially movable in direction of the drive shaft, and forming the armature of a coupling magnet fixed to the motor housing. The flywheel positioning member is arranged to move the flywheel during energizing of the aforementioned magnet into frictional engagement with the coupling member fixed to the output shaft of the motor. This flywheel positioning member is preferably secured against rotation on the bearing shield of the drive shaft of the motor.

The brake abutment member is in accordance with the present invention constituted by a cylindrical body concentric to the output shaft of the motor and secured against rotation to the motor housing and forming the armature of a brake magnet fixed to the housing. Thereby the braking abutment member is preferably secured against rotation to the bearing shield of the output shaft of the motor, which is arranged coaxially with and laterally spaced from the drive shaft bearing shield. This construction permits an especially simple assembly and maintenance of the motor.

The coupling member, which is fixedly connected to the output shaft, may in principle be constructed as a one-piece element. Preferably however this coupling member comprises a coupling disk and a brake disk, both of which are fixed to the output shaft for rotation therewith and axially immovable.

The flywheel positioning member and the brake abutment member are preferably axially movable guided by ball guides relative to the housing parts carrying the same. Such guides have an especially low friction, they work substantially without noise and practically avoid any undesired clearance. To transmit the axial movement of the flywheel positioning member to the flywheel, a thrust bearing between these two elements is especially suitable, which preferably is held together by a permanent magnet. Instead, of this construction a radial and axial thrust bearing may also be provided.

According to a further feature of the present invention the coupling disk and/or the brake disk are constructed as fan wheels with openings for the cooling air.

The coupling and brake magnets preferably surround the coupling member, coaxially therewith. By means of an air guide sheet metal, preferably arranged between the coupling and the brake disk, it is possible to guide the cooling air stream through a gap between the coupling and the brake magnet so as to dissipate the heat created by energizing the same.

The coupling magnet and the brake magnet are preferably axially adjustable by threaded rings relative to the bearing shields. This facilitates the adjustment of the axial position of the magnets and wear of the friction layers, provided on opposite sides of the coupling member, can thus be compensated in a very simple manner.

Since the coupling member does not form part of the magnetic circuit, it may be constructed of non-magnetic, light metal or plastic material.

The coupling and the brake disk are preferably provided with friction liners made of cork saturated with lubricating material, whereas the couple and brake faces of the flywheel, respectively of the brake abutment member are preferably provided with a layer of sintered powdered metal, of bronze and/or of plastic material, which have relative to the cork a better friction characteristic than iron.

The brake abutment member is preferably provided with ribs. Thereby the cooling is improved, whereas the mechanical rigidity is increased without substantially increasing the mass of the brake abutment member.

The output shaft is preferably mounted for rotation by means of a pair of angular contact ball bearings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
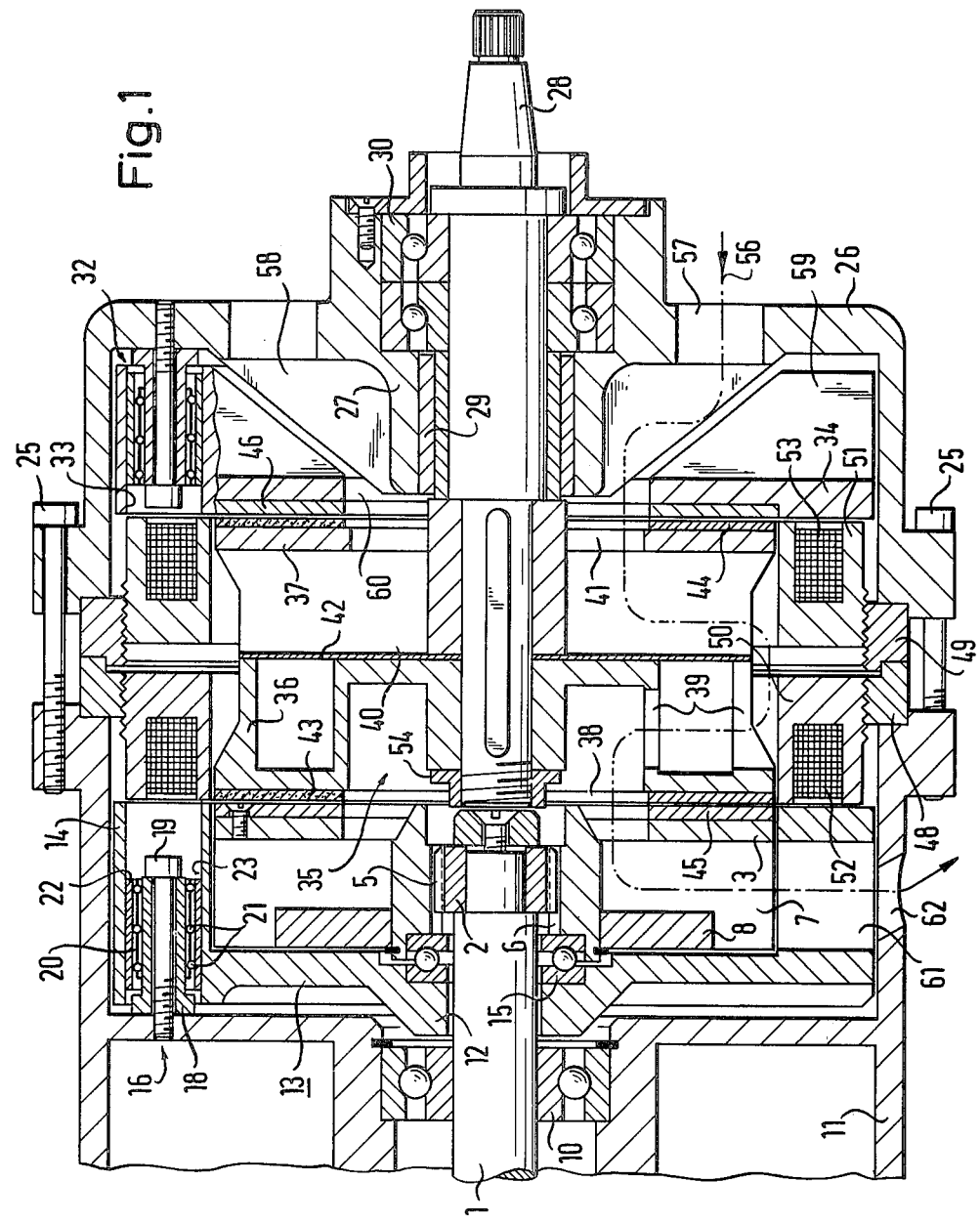
FIG. 1 is an axial cross-section through the coupling and braking unit of a motor according to the present invention.

Referring now to the drawing, and more specifically to FIG. 1 of the same, it will be seen that the continuously rotating drive shaft 1 of a standard electric motor, not further shown in the drawing, carries at one end thereof a guide member 2 for rotation therewith, provided at its outer surface thereof with splines. A flywheel 3 provided at its hub with an internal gearing 5, corresponding to the splines in the guide member 2, is mounted on the latter for rotation therewith and axially movable with respect thereto. The flywheel 3, which is preferably formed of cast iron, is provided with a plurality of circumferentially displaced cooling air channels 7. A permanent magnet 8 is fixed to the hub of the flywheel 3 on the side thereof facing the motor. The shaft 1 is mounted for rotation in a ball bearing 10 located in the bearing shield 11 of the motor. The hub 12 of a flywheel positioning member 13 of ferromagnetic material is located between the bearing shield 11 and the flywheel 3. The flywheel positioning member 13 has an annular portion 14 concentrically surrounding the flywheel 3. The flywheel positioning member 13 abuts against the flywheel 3 by means of a ball thrust bearing 15, the races of which are held in engagement with the balls therebetween by means of the aforementioned permanent magnet 8.

A plurality, for instance three, ball guides 16, which are circumferentially displaced from each other, secure the flywheel positioning member 13 to the bearing shield 11 against rotation, while permitting a limited axial movement of the member 13. The ball guides 16, of which only one is shown in FIG. 1, are each provided with an inner cylindrical bushing 18, which is fixed to the bearing shield 11 by a screw 19. The inner bushing 18 is encompassed by a ball bushing 20 in which a plurality of balls 21 are freely rotatably secured. The balls 21 are axially and circumferentially distributed about the inner guide bushing 18 and engage the outer surface thereof as well as the inner surface of a bearing bushing 22, which is press-fitted into an axial bore 23 in the annular portion 14 of the flywheel positioning member 13.

An additional bearing shield 26, axially displaced and coaxially arranged with respect to the bearing shield 11, is fixed to the latter by a plurality of circumferentially displaced screws 25. An output shaft 28 is rotatably mounted in the hub 27 of the additional bearing shield 26 by means of a slide bearing 29, as well as angular contact bearings 30. A plurality of ball guides 32, constructed in the same manner as the above-described ball guide 16, are mounted in axial bores 33 of an annular brake abutment member 34 to secure the brake abutment member 34 against rotation to the additional bearing shield 26, while providing a limited axial movement of the brake abutment member relative to the bearing shield.

A coupling member 35 is fixed to the inner portion of the output shaft 28 against rotation and axial movement. The coupling member 35 preferably comprises a coupling disk 36, as well as a brake disk 37. Both disks 36 and 37 are constructed as fan wheels and provided with openings or passages 38, 39 respectively 40, 41. An air guide sheet metal member 42 is arranged between the two disks. The coupling disks 36 and the brake disk 37 are provided on end faces thereof respectively directed to the flywheel 3 and the brake abutment member 34 with liners 43 and 44, respectively, which are preferably constructed of cork impregnated with lubricating material. The flywheel 3 and the braking element 34 are provided on end faces thereof respectively facing the liners 43 and 44 with a coupling liner 45 respectively a brake liner 46. The liners 45, 46 may be constructed of sintered powder metal, bronze and/or a suitable plastic material and they are respectively connected to the flywheel 3 and the brake abutment member 34.

The bearing shields 11 and 26 carry, on end faces thereof which are directed towards each other, rings 48 and 49 provided with threads at the inner peripheral surface thereof into which a coupling magnet 50, respectively a brake magnet 51 are threaded. The two magnets are electromagnets, which respectively concentrically surround the coupling disk 36 and the brake disk 37. The two magnets 50 and 51 have the same inner and outer diameters and the windings thereof are designated with 52 and 53 in the drawing. The coupling disk 36 and the brake disk 37 are keyed, in the manner shown, to the output shaft 28 and secured against axial movement along the latter by a nut 54 screwed onto the inner end of the output shaft 28. Of course, the two disks may be secured to the output shaft against rotation and axial movement also in any other manner.

If during operation neither of the windings 52 and 53 is energized, then the flywheel 3 turns with the drive shaft 1, without taking along the output shaft 28. If now the winding 52 is energized, then the coupling magnet 50 axially moves the flywheel positioning member 13 towards the right, as viewed in FIG. 1. Thereby the flywheel 3 is moved by the thrust bearing 15 also towards the right and the coupling liner 45 on the flywheel is pressed against the friction liner 43 on the coupling disk 36. The output shaft is thereby accelerated to the number of revolutions of the main or drive shaft 1.

If now the winding 52 is deenergized and the winding 53 of the brake magnet 51 is energized, the brake abutment 34 is moved towards the left, as viewed in FIG. 1, to provide thereby frictional engagement between the brake liner 46 on the brake abutment 34 and the friction liner 44 on the brake disk 37. The output shaft 28 is thus braked.

It is to be understood that instead of an alternating energizing of the coupling magnet 50 and the brake magnet 51, the two magnets may also be energized in an overlapping manner, but such an operation is less advantageous in view of the heat development.

The continuously rotating flywheel 3 acts, due to the cooling air channel 7 provided therein as a fan wheel which sucks in a cooling air stream 56, indicated by the dash-dotted line shown in FIG. 1. The cooling air stream 56 enters through openings 57 in the additional bearing shield 26 into the coupling and brake system, passes through the free space between the ribs 58, 59 of the bearing shield 26 and the brake abutment member 34 to subsequently flow through the central opening 60 of the brake abutment member 34 as well as through the central opening 41 of the brake disk 37 into the latter. From there the cooling air stream passes, due to the air guide sheet metal 42, radially outwardly through the passages 40. Subsequently thereto, the cooling air 56 stream passes through the gap between the inner faces of the coupling magnet 50 and the brake magnet 51 to finally pass through the openings 38, 39 in the coupling disk 36, the cooling air channels 7 in the flywheel 3, the openings 61 in the annular portion 14 of the flywheel positioning member 13 and the opening 62 in the bearing shield 11 to the outside of the motor. If the output shaft 28 is coupled to the drive shaft 1 for rotation therewith, the cooling air stream is intensified by the fan-wheel action of coupling and brake disk.

The arrangement can be easily adjusted by means of the threaded rings 48 and 49. Damage of any of the elements during such adjustment is thereby positively excluded.

Figure 2:
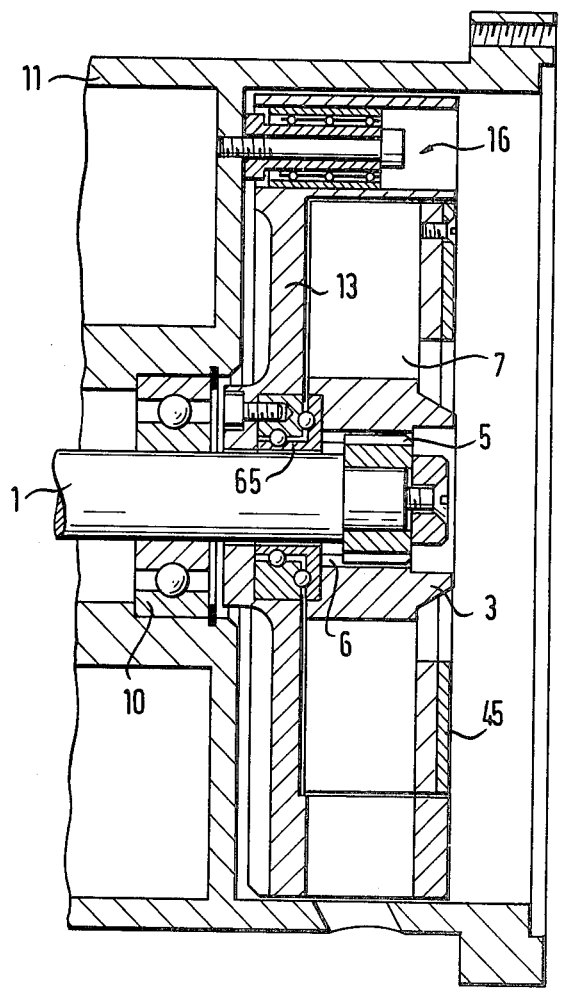
FIG. 2 is an axial cross-section through a modified embodiment in which, however, the output shaft, the bearing shield mounting the same as well as the brake and coupling magnets are omitted.

The embodiment illustrated in FIG. 2 differs from the above-described embodiment only that instead the thrust bearing 15 and the permanent magnet 8 coordinated therewith, a combined radial and axial thrust bearing 65 is provided between the hub 12 of the flywheel positioning member 13 and the flywheel 3, which bearing is connected by screws to the body of the flywheel positioning member 13.

It will be understood that each of the elements described above, or two or more together, may also find a useful application in other types of electric coupling and brake motors differing from the types described above.

While the invention has been illustrated and described as embodied in an electric coupling and brake motor, it is not intended to be limited to the details show, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an electric coupling and brake motor, a combination comprising a continuously rotating drive shaft of the motor; an output shaft axially aligned with said drive shaft; housing means in which said drive shaft and said output shaft are mounted for rotation; a coupling member fixedly mounted on said output shaft for rotation therewith and axially immovable with respect thereto; a flywheel mounted on one side of said coupling member on said drive shaft for rotation therewith and axially movable relative thereto toward and away from said coupling member; a coupling magnet fixed to said housing means; a cylindrical flywheel positioning means non-rotatable but axially freely movably connected to said housing means, said flywheel positioning means forming an armature of said coupling magnet and being arranged to move said flywheel upon energizing of said coupling magnet into frictional engagement with said coupling member; a brake magnet fixed to said housing means; a brake abutment member on the other side of said coupling member, said brake abutment member being coaxial with said output shaft and connected to said housing means against rotation but freely movable in axial direction relative thereto, said brake abutment member forming an armature for the brake magnet, so that by energizing said coupling magnet said output shaft will be rotated by said continuously rotating drive shaft, while by energizing said brake magnet said output shaft will be braked.

2. A combination as defined in claim 1, wherein said housing means comprises a bearing shield for the drive shaft, said flywheel positioning means being connected to said bearing shield against rotation but axially movable with respect thereto.

3. A combination as defined in claim 1, wherein said housing means comprises a first bearing shield for said drive shaft and a second bearing shield for said output shaft coaxial with and axially displaced fixed to said first bearing shield, said brake abutment member being connected to said second bearing shield against rotation but movable in axial direction relative thereto.

4. A combination as defined in claim 1, wherein said coupling member comprises a coupling disk facing said flywheel and a brake disk facing said brake abutment member.

5. A combination as defined in claim 1, and said housing means comprising a first bearing shield for said drive shaft and a second bearing shield for said output shaft coaxial and axially displaced fixed to said first bearing shield, and ball guide means on said first and on said second bearing shield respectively cooperating with said flywheel positioning means and said brake abutment member for respectively mounting said flywheel positioning means and said brake abutment member non-rotatably but axially movably with respect to the bearing shields.

6. A combination as defined in claim 1, and including a thrust bearing between said flywheel positioning means and said flywheel for transmitting axial movement of said flywheel positioning means to said flywheel.

7. A combination as defined in claim 6, wherein said thrust bearing comprises a pair of races respectively coaxially fixed to said flywheel positioning means and said flywheel and a plurality of balls between said races, and including permanent magnet means arranged and constructed for keeping said races in engagement with said balls.

8. A combination as defined in claim 1, and including a combined radial and axial thrust bearing between said flywheel positioning means and said flywheel for transmitting axial movement of said flywheel positioning means to said flywheel.

9. A combination as defined in claim 4, wherein at least one of said disks is constructed as a fanwheel with air passages therethrough.

10. A combination as defined in claim 1, wherein said coupling magnet means and said brake magnet means constructed as annular members coaxial with and surrounding said coupling member.

11. A combination as defined in claim 10, wherein said brake magnet means and said coupling magnet means are axially displaced from each other to define a gap therebetween, and means including an air guide sheet metal for guiding a cooling air stream through said gap.

12. A combination as defined in claim 11, wherein said coupling member comprises a coupling disk facing said flywheel and a brake disk facing said brake abutment member, said air guide metal sheet being arranged between said disks.

13. A combination as defined in claim 1, and said housing means comprising a first bearing shield for said drive shaft and a second bearing shield for said output shaft coaxially with and axially displaced from said first bearing shield, and fixed to the latter, and including ring means sandwiched between said first and said second bearing shield, said ring means being provided with an internal screw thread, and said coupling magnet means as well as said brake magnet means being provided with an external screw thread meshing with said internal screw thread for axially adjusting said brake magnet means and said coupling magnet means relative to said bearing shields.

14. A combination as defined in claim 1, wherein said coupling member is formed from non-magnetizable light material.

15. A combination as defined in claim 1, wherein said flywheel and said brake abutment member each having an end face facing said coupling member and including a liner for each of said end faces, said liner being formed from a material taken from the group consisting of sintered powder metal, bronze and plastic material.

16. A combination as defined in claim 4, wherein said coupling disk and said brake disk have each an end face respectively facing said flywheel and said brake abutment member and including a brake liner of cork impregnated with lubricating material on each of said end faces of said coupling disk and said brake disk.

17. A combination as defined in claim 1, wherein said brake abutment member is provided on the side thereof facing away from said coupling member with a plurality of axially extending and circumferentially displaced ribs.

18. A combination as defined in claim 1, and said housing means comprising a bearing shield for said output shaft, and a pair of angular contact ball bearings mounting said output shaft in said bearing shield.

* * * * *